(12) United States Patent
Chatterji et al.

(10) Patent No.: US 7,032,669 B2
(45) Date of Patent: Apr. 25, 2006

(54) COMPOSITIONS AND METHODS FOR PREVENTING COAGULATION OF WATER-IN-OIL EMULSION POLYMERS IN AQUEOUS SALINE WELL TREATING FLUIDS

(75) Inventors: Jiten Chatterji, Duncan, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 265 days.

(21) Appl. No.: 10/631,248

(22) Filed: Jul. 31, 2003

(65) Prior Publication Data

US 2005/0022990 A1  Feb. 3, 2005

(51) Int. Cl.
 *E21B 43/27* (2006.01)
(52) U.S. Cl. .................................. 166/300; 166/305.1
(58) Field of Classification Search ................ 166/300, 166/292, 295, 305.1, 279
 See application file for complete search history.

(56) References Cited

U.S. PATENT DOCUMENTS

| | | | | |
|---|---|---|---|---|
| 4,068,676 A | | 1/1978 | Thorn et al. .................... 137/13 |
| 5,258,428 A | | 11/1993 | Gopalkrishnan ................ 524/5 |
| 5,480,863 A | | 1/1996 | Oakley et al. .............. 507/225 |
| 5,507,344 A | * | 4/1996 | Young et al. ................ 166/281 |
| 5,688,844 A | | 11/1997 | Chatterji et al. ................ 524/8 |
| 5,738,463 A | | 4/1998 | Onan .......................... 405/154 |
| 5,795,924 A | | 8/1998 | Chatterji et al. ............. 523/130 |
| 5,820,670 A | | 10/1998 | Chatterji et al. ............. 106/727 |
| 5,945,387 A | | 8/1999 | Chatterji et al. ............. 507/224 |
| 6,258,757 B1 | | 7/2001 | Sweatman et al. ........... 507/219 |
| 6,271,181 B1 | | 8/2001 | Chatterji et al. ............. 507/219 |
| 6,302,209 B1 | * | 10/2001 | Thompson et al. ....... 166/305.1 |
| 6,315,042 B1 | * | 11/2001 | Griffith et al. .............. 166/291 |
| 6,328,106 B1 | | 12/2001 | Griffith et al. .............. 166/295 |
| 6,401,817 B1 | | 6/2002 | Griffith et al. .............. 166/295 |
| 6,448,206 B1 | | 9/2002 | Griffith et al. .............. 507/219 |
| 6,503,870 B1 | | 1/2003 | Griffith et al. .............. 507/219 |
| 6,555,507 B1 | | 4/2003 | Chatterji et al. ............. 507/219 |
| 2002/0096090 A1 | * | 7/2002 | Chatterji et al. ............. 106/672 |
| 2002/0160919 A1 | | 10/2002 | Stowe, II et al. ........... 507/100 |
| 2003/0083204 A1 | | 5/2003 | Chatterji et al. ............. 507/200 |

FOREIGN PATENT DOCUMENTS

EP    0 816 302 B1    3/2001
EP    1 193 365 A1    4/2002

OTHER PUBLICATIONS

Foreign communication from a related counterpart application dated Dec. 10, 2004.

* cited by examiner

*Primary Examiner*—Brian E. Glessner
*Assistant Examiner*—Bryan A. Fuller
(74) *Attorney, Agent, or Firm*—Craig W. Roddy; Baker Botts L.L.P.

(57) ABSTRACT

Methods of combining water-in-oil emulsion polymers with aqueous saline well treating fluids and compositions are provided. A composition of the invention basically comprises hydraulic cement, an aqueous saline fluid sufficient to form a slurry, a polymer precipitation and coagulation preventing surfactant, and a water-in-oil emulsion polymer.

20 Claims, No Drawings

COMPOSITIONS AND METHODS FOR PREVENTING COAGULATION OF WATER-IN-OIL EMULSION POLYMERS IN AQUEOUS SALINE WELL TREATING FLUIDS

BACKGROUND OF THE INVENTION

1. Field of the Invention

The present invention relates to compositions and methods of combining a water-in-oil emulsion polymer with an aqueous saline well treating fluid without coagulation of the polymer.

2. Description of the Prior Art

Aqueous saline well treating fluids are used in a variety of operations and treatments in oil and gas wells. Such operations and treatments include, but are not limited to, well completion operations, production stimulation treatments, formation permeability conformance control treatments, and treatments to reduce undesirable well bore fluid inflows and outflows.

An example of a well completion operation is primary cementing. In a primary cementing operation, a string of pipe such as casing or a liner is cemented in a well bore. In performing primary cementing, a cement composition is pumped into the annular space between the walls of a well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to walls of the well bore whereby the undesirable migration of fluids between zones or formations penetrated by the well bore is prevented.

Another example of a well completion operation that involves the use of a viscous aqueous saline treating fluid is gravel packing. In gravel packing operations, solid gravel particles such as sand are carried to a subterranean zone in which a gravel pack is to be placed by a viscous gelled treating fluid, often a viscous gelled aqueous saline treating fluid. That is, the gravel pack is suspended in the viscous treating fluid at the surface and carried to the subterranean zone in which the gravel pack is to be placed. Once the gravel is placed in the zone, the high viscosity gelled aqueous treating fluid is broken (the viscosity is reduced) and recovered (returned to the surface). The gravel pack produced functions as a filter to separate formation solids from produced fluids while permitting the produced fluids to flow into and through the well bore.

An example of a production stimulation treatment utilizing a viscous gelled aqueous treating fluid is hydraulic fracturing. That is, the viscous treating fluid, referred to in the art as a fracturing fluid, is pumped through the well bore into a subterranean zone to be stimulated at a rate and pressure such that fractures are formed and extended into the subterranean zone. The fracturing fluid also carries particulate proppant material, e.g., sand, into the fractures. The proppant material is suspended in the viscous treating fluid so that the proppant material is deposited in the fractures when the viscous fracturing fluid is broken and recovered. The proppant material functions to prevent the formed fractures from closing whereby conductive channels are formed through which produced fluids can flow to the well bore.

An example of a formation permeability conformance control treatment involves enhanced recovery techniques such as water flooding. In water flooding, an aqueous displacement fluid is injected under pressure into an oil containing subterranean formation by way of one or more injection wells. The flow of the aqueous fluid through the formation displaces oil contained therein and drives it to one or more producing wells. Prior to injecting the displacement fluid into the subterranean formation, the permeability of the subterranean flow passages having high permeability and low oil content is reduced. This is accomplished by injecting aqueous solutions, often aqueous saline solutions containing polymers into the high permeability flow passages whereby the polymers are gelled and cross-linked therein.

An example of a treatment to reduce undesirable well bore fluid inflows and outflows involves the production of oil and/or gas from formations containing permeable channels therein through which inflows or outflows occur. For example, when an oil-bearing formation contains highly, permeable water channels communicating the well with water zones, undesirable water enters the well. In order to plug the channels, polymers have been introduced into the water channels wherein the polymers are cross-linked so that the water channels are plugged.

In onshore wells and offshore platform wells, polymer additives to be utilized in aqueous treating fluids are transported to the well location in liquid form. Examples of the polymer additives utilized include, but are not limited to, fluid loss control additives, viscosity increasing gelling agents, dispersants, cement set retarders and the like. However, because many of the polymer additives form extremely viscous solutions in small concentrations of water, large volumes of the polymer additive solutions in small additive concentrations are required to perform a well treatment.

Many of the well treating fluid polymer additives are synthesized as water-in-oil emulsions that contain high quantities of the polymer (referred to herein as "water-in-oil emulsion polymers"). However, when the water-in-oil emulsion polymer additives are combined with an aqueous saline fluid, the polymers immediately form precipitates which coagulate in the saline fluid.

Thus, there is a need for a method of combining a water-in-oil emulsion polymer additive with an aqueous saline well treating fluid without precipitation and coagulation of the polymer additive in the fluid.

SUMMARY OF THE INVENTION

The present invention provides improved methods of combining water-in-oil emulsion polymers with aqueous saline well treating fluids and compositions which meet the need described above and overcome the deficiencies of the prior art. A method of this invention for combining a water-in-oil emulsion polymer with an aqueous saline well treating fluid without precipitation and coagulation of the polymer comprises the following steps. A polymer precipitation and coagulation preventing surfactant is mixed with the aqueous saline fluid to form an aqueous saline fluid solution thereof. Thereafter, the water-in-oil emulsion polymer is combined with the aqueous saline fluid solution.

A method of the present invention for treating a subterranean zone penetrated by a well bore comprises the following steps. A treating fluid comprising an aqueous saline fluid, a polymer precipitation and coagulation preventing surfactant and a water-in-oil emulsion polymer is prepared. Thereafter, the treating fluid is introduced into a subterranean zone.

A cement composition of this invention comprises a hydraulic cement, an aqueous saline fluid sufficient to form a slurry, a polymer precipitation and coagulation preventing surfactant, and a water-in-oil emulsion polymer.

The objects, features and advantages of the present invention will be readily apparent to those skilled in the art upon a reading of the description of preferred embodiments which follows.

DESCRIPTION OF PREFERRED EMBODIMENTS

As mentioned above, when a water-in-oil emulsion polymer is added to an aqueous saline well treating fluid, the polymer immediately forms a precipitate that coagulates. It has now been discovered that when certain surfactants are mixed with the aqueous saline well treating fluid to form a solution thereof, the subsequent addition of the water-in-oil emulsion polymer to the aqueous saline fluid solution does not result in the precipitation and coagulation of the polymer. Thus, a method of this invention for combining a water-in-oil emulsion polymer with an aqueous saline well treating fluid without precipitation and coagulation of the polymer comprises the following steps. A polymer precipitation and coagulation preventing surfactant is mixed with the aqueous saline fluid to form an aqueous saline fluid solution thereof. Thereafter, the water-in-oil emulsion polymer is combined with the aqueous saline fluid solution.

The aqueous saline well treating fluid can be salt water, brine or seawater. Generally, the aqueous saline well treating fluid is brine at onshore well locations and is seawater at offshore well locations.

Examples of polymer precipitation and coagulation preventing surfactants that can be utilized include, but are not limited to, a $C_{4-12}$ alcohol ether sulfate substituted with 3 moles of ethylene oxide, a $C_{9-16}$ alcohol ether sulfate substituted with 2.5 moles of ethylene oxide, a $C_{8-10}$ alcohol ether sulfate substituted with 2.2 moles of ethylene oxide, a $C_{6-10}$ alcohol ether sulfate substituted with 2.5 moles of ethylene oxide, a $C_{8-10}$ alcohol ether sulfate substituted with 8 moles of ethylene oxide, a $C_{8-10}$ alcohol ether sulfate substituted with 6 moles of ethylene oxide, a $C_{8-10}$ alcohol ether sulfate substituted with 12 moles of ethylene oxide, and a $C_{14-16}$ alpha-olefin sulfonate. Of these, a $C_{6-10}$ alcohol ether sulfate substituted with 2.5 moles of ethylene oxide is preferred. The polymer precipitation and coagulation preventing surfactant utilized is generally present in the aqueous saline fluid solution in an amount in the range of from about 0.2% to about 1.5% by weight of water in said solution.

A variety of polymers in water-in-oil emulsions can be utilized. Examples of such polymers include, but are not limited to, a copolymer of styrene and butadiene utilized in well cement compositions to provide resiliency thereto, a copolymer of 2-acrylamido-2-propane sulfonic acid and N,N-dimethylacrylamide which functions as a fluid loss control additive in well cement compositions; a terpolymer of 2-acrylamido-2-propane sulfonic acid, acrylamide, and N,N-dimethylacrylamide which also functions as a fluid loss control additive in well cement compositions; guar gum and derivatives thereof included in well treating fluids to provide viscosity thereto, cellulose derivatives included in well treating fluids to provide viscosity thereto; polyvinyl pyrrolidone included in well treating fluids to provide viscosity thereto; xanthan gum included in well treating fluids to provide viscosity thereto; and welan gum included in well treating fluids to provide viscosity thereto.

The polymer is generally present in the water-in-oil emulsion in an amount in the range of from about 30% to about 45% by weight of the emulsion.

The water-in-oil emulsion polymer is present in the aqueous saline fluid solution in an amount in the range of from about 5% to about 50% by weight thereof.

A method of the present invention for treating a subterranean zone penetrated by a well bore comprises the following steps. A treating fluid comprising an aqueous saline fluid, a polymer precipitation and coagulation preventing surfactant and a water-in-oil emulsion polymer is prepared. Thereafter, the treating fluid is introduced into the subterranean zone.

The various polymer precipitation and coagulation preventing surfactants that can be used and the various water-in-oil emulsion polymers that can be used are the same as those described above and are included in the amounts set forth above. When the treating fluid is a well cement composition, it includes the components described above and a hydraulic cement.

A cement composition of this invention comprises hydraulic cement, an aqueous saline fluid sufficient to form a slurry, a polymer precipitation and coagulation preventing surfactant and a water-in-oil emulsion polymer.

The hydraulic cement in the cement composition includes, but is not limited to, Portland cements, slag cements, pozzolana cements, gypsum cements, alumina cements, and alkaline cements. Of these, Portland cement is preferred.

The saline fluid is selected from salt water, brine and seawater and is present in the cement composition in an amount in the range of from about 30% to about 65% by weight of cement therein.

The polymer precipitation and coagulation preventing surfactants that can be used are the same as those described above and are included in the cement composition in an amount in the range of from about 0.1% to about 1% by weight of cement therein.

The water-in-oil emulsion polymer can be one of the cement composition polymer additives mentioned above and is present in the emulsion in an amount in the range of from about 30% to about 45% by weight of the emulsion.

The water-in-oil emulsion polymer is present in the cement composition in an amount in the range of from about 5% to about 50% by weight of water therein.

A preferred method of combining a water-in-oil emulsion polymer in the water phase thereof with an aqueous saline well treating fluid without precipitation and coagulation of the polymer comprises the steps of: (a) mixing a polymer precipitation and coagulation preventing surfactant with the aqueous saline fluid to form an aqueous saline fluid solution thereof, and then (b) combining the water-in-oil emulsion polymer with the aqueous saline fluid solution.

A preferred method of treating a subterranean zone penetrated by a well bore comprises the steps of: (a) preparing a treating fluid comprising an aqueous saline fluid, a polymer precipitation and coagulation preventing surfactant and a water-in-oil emulsion polymer in the water phase thereof, and (b) introducing the treating fluid into the subterranean zone.

A preferred cement composition comprises: hydraulic cement; an aqueous saline fluid sufficient to form a slurry; a polymer precipitation and coagulation preventing surfactant; and a water-in-oil emulsion polymer.

In order to further illustrate the methods and compositions of this invention, the following examples are given.

EXAMPLE 1

In the laboratory, 0.75 milliliters of a $C_{4-12}$ alcohol ether sulfate surfactant substituted with 3 moles of ethylene oxide (EO) was added to 65 grams of seawater. To the resulting solution, 33 milliliters of a water-in-oil emulsion containing 17.5% by weight of a cement resilience imparting additive comprising a copolymer of 25% by weight styrene and 75% by weight butadiene were added to determine if precipitation and coagulation took place.

The above test was repeated seven times using seven other surfactants. The surfactants, added to the seawater and their amounts, the amounts of seawater and emulsion polymer used, and the results of the tests are given in Table I below.

to determine if precipitation and coagulation took place. The surfactants added to the seawater and their amounts, the amounts of seawater and emulsion polymer used, and the results of the tests are given in Table II below.

TABLE I

| Surfactant | Amount of Seawater Used, grams | Amount of Surfactant Added, mL | Amount of Emulsion Polymer Used, mL | Test Results |
|---|---|---|---|---|
| $C_{4-12}$ Alcohol Ether Sulfate Substituted with 3 Moles of EO | 65 | 0.75 | 33 | No Precipitation |
| $C_{9-16}$ Alcohol Ether Sulfate Substituted with 2.5 Moles of EO | 65 | 0.50 | 33 | No Precipitation |
| $C_{8-10}$ Alcohol Ether Sulfate Substituted with 2.2 Moles of EO | 65 | 0.75 | 33 | No Precipitation |
| $C_{14-16}$ Alpha Olefin Sulfonate | 65 | 1.25 | 33 | No Precipitation |
| $C_{6-10}$ Alcohol Ether Sulfate Substituted with 2.5 Moles of EO | 65 | 0.375 | 33 | No Precipitation |
| $C_{8-10}$ Alcohol Ether Sulfate Substituted with 8 Moles of EO | 65 | 0.50 | 33 | No Precipitation |
| $C_{8-10}$ Alcohol Ether Sulfate Substituted with 6 Moles of EO | 65 | 0.75 | 33 | No Precipitation |
| $C_{8-10}$ Alcohol Ether Sulfate Substituted with 12 Moles of EO | 65 | 0.75 | 33 | No Precipitation |

From Table I, it can be seen that the various surfactants tested prevented polymer precipitation and coagulation.

TABLE II

| Surfactant | Amount of Seawater Used, grams | Amount of Surfactant Added, mL | Amount of Emulsion Polymer Used, mL | Test Results |
|---|---|---|---|---|
| $C_{4-12}$ Alcohol Ether Sulfate Substituted with 3 Moles of EO | 50 | 0.05 | 2.5 | No Precipitation |
| $C_{9-16}$ Alcohol Ether Sulfate Substituted with 2.5 Moles of EO | 50 | 0.05 | 2.5 | No Precipitation |
| $C_{8-10}$ Alcohol Ether Sulfate Substituted with 2.2 Moles of EO | 50 | 0.05 | 2.5 | No Precipitation |
| $C_{14-16}$ Alpha Olefin Sulfonate | 50 | 0.05 | 2.5 | No Precipitation |
| $C_{6-10}$ Alcohol Ether Sulfate Substituted with 2.5 Moles of EO | 50 | 0.01 | 2.5 | No Precipitation |
| $C_{8-10}$ Alcohol Ether Sulfate Substituted with 8 Moles of EO | 50 | 0.05 | 2.5 | No Precipitation |
| $C_{8-10}$ Alcohol Ether Sulfate Substituted with 6 Moles of EO | 50 | 0.05 | 2.5 | No Precipitation |
| $C_{8-10}$ Alcohol Ether Sulfate Substituted with 12 Moles of EO | 50 | 0.05 | 2.5 | No Precipitation |

EXAMPLE 2

Example 1 was repeated except that 2.5 milliliters of a water-in-oil emulsion containing 40.6% by weight of a cement fluid loss control additive comprising a copolymer of 2-acrylamido-2-propane sulfonic acid and N,N-dimethylacrylamide were added to the seawater-surfactant solutions From Table II, it can be seen that the various surfactants prevented polymer precipitation and coagulation.

EXAMPLE 3

Example 1 was repeated except that 2.5 milliliters of a water-in-oil emulsion containing 42% by weight of a cement fluid loss control additive comprising a terpolymer of 2-acrylamido-2-propane sulfonic acid, acrylamide and N,N-dimethylacrylamide were added to the seawater-surfactant solutions to determine if precipitation and coagulation took place. The surfactants added to the seawater and their amounts, the amounts of seawater and emulsion polymer used, and the results of the tests are given in Table III below.

TABLE III

| Surfactant | Amount of Seawater Used, grams | Amount of Surfactant Added, mL | Amount of Emulsion Polymer Used, mL | Test Results |
|---|---|---|---|---|
| $C_{4-12}$ Alcohol Ether Sulfate Substituted with 3 Moles of EO | 50 | 0.05 | 2.5 | No Precipitation |
| $C_{9-16}$ Alcohol Ether Sulfate Substituted with 2.5 Moles of EO | 50 | 0.05 | 2.5 | No Precipitation |
| $C_{8-10}$ Alcohol Ether Sulfate Substituted with 2.2 Moles of EO | 50 | 0.05 | 2.5 | No Precipitation |
| $C_{14-16}$ Alpha Olefin Sulfonate | 50 | 0.05 | 2.5 | No Precipitation |
| $C_{6-10}$ Alcohol Ether Sulfate Substituted with 2.5 Moles of EO | 50 | 0.05 | 2.5 | No Precipitation |
| $C_{8-10}$ Alcohol Ether Sulfate Substituted with 8 Moles of EO | 50 | 0.05 | 2.5 | No Precipitation |
| $C_{8-10}$ Alcohol Ether Sulfate Substituted with 6 Moles of EO | 50 | 0.05 | 2.5 | No Precipitation |
| $C_{8-10}$ Alcohol Ether Sulfate Substituted with 12 Moles of EO | 50 | 0.05 | 2.5 | No Precipitation |

From Table III, it can be seen that the various surfactants prevented polymer precipitation and coagulation.

EXAMPLE 4

65 grams of seawater were added to each of two 500 mL beakers. To one of the beakers, 0.375 mL of a $C_{6-10}$ alcohol ether sulfate surfactant substituted with 2.5 moles of ethylene oxide was added followed by gentle agitation to dissolve the surfactant in the seawater. Thereafter, 35 mL of a water-in-oil emulsion containing 47.5% by weight of a copolymer of 25% by weight styrene and 75% by weight butadiene were added to each beaker. The addition of the emulsion polymer to the beaker that did not contain the surfactant resulted in the immediate precipitation and coagulation of the styrene-butadiene copolymer. The addition of the emulsion polymer to the beaker that contained the surfactant formed a homogeneous mixture.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:
1. A method of combining a water-in-oil emulsion polymer with an aqueous saline well treating fluid without precipitation and coagulation of the polymer comprising the steps of:
mixing a polymer precipitation and coagulation preventing surfactant with said aqueous saline fluid to form an aqueous saline fluid solution thereof; and
combining said water-in-oil emulsion polymer with said aqueous saline fluid solution.
2. The method of claim 1 wherein said aqueous saline fluid is selected from the group consisting of unsaturated salt water, brine and seawater.
3. The method of claim 1 wherein said aqueous saline fluid is seawater.
4. The method of claim 1 wherein said polymer precipitation and coagulation preventing surfactant is selected from the group consisting of a $C_{4-12}$ alcohol ether sulfate substituted with 3 moles of ethylene oxide, a $C_{9-16}$ alcohol ether sulfate substituted with 2.5 moles of ethylene oxide, a $C_{8-10}$ alcohol ether sulfate substituted with 2.2 moles of ethylene oxide, a $C_{6-10}$ alcohol ether sulfate substituted with 2.5 moles of ethylene oxide, a $C_{8-10}$ alcohol ether sulfate substituted with 8 moles of ethylene oxide, a $C_{8-10}$ alcohol ether sulfate substituted with 6 moles of ethylene oxide, a $C_{8-10}$ alcohol ether sulfate substituted with 12 moles of ethylene oxide, and a $C_{14-16}$ alpha-olefin sulfonate.
5. The method of claim 1 wherein said polymer precipitation and coagulation preventing surfactant is a $C_{6-10}$ alcohol ether sulfonate substituted with 2.5 moles of ethylene oxide.
6. The method of claim 1 wherein said polymer precipitation and coagulation preventing surfactant is present in said aqueous saline fluid solution in an amount in the range of from about 0.2% to about 1.5% by weight of water in said solution.
7. The method of claim 1 wherein said polymer in said water-in-oil emulsion is selected from the group consisting of a copolymer of styrene and butadiene; a copolymer of 2-acrylamido-2-propane sulfonic acid and N,N-dimethylacrylamide; a terpolymer of 2-acrylamido-2-propane sulfonic acid, acrylamide, and N,N-dimethylacrylamide; guar gum and derivatives thereof; cellulose derivatives; polyvinyl pyrrolidone; xanthan gum and welan gum.
8. The method of claim 7 wherein said polymer is present in said water-in-oil emulsion in an amount in the range of from 30% to about 45% by weight of said emulsion.
9. The method of claim 1 wherein said water-in-oil emulsion polymer is present in said aqueous saline fluid solution in an amount in the range of from about 5% to about 50% by weight thereof.
10. A method of treating a subterranean zone penetrated by a well bore that comprises the steps of:
preparing a treating fluid comprising an aqueous saline fluid, a polymer precipitation and coagulation preventing surfactant and a water-in-oil emulsion polymer, wherein said water-in-oil polymer does not precipitate or coagulate, wherein said step of preparing said treating fluid comprises the step of:
combining said water-in-oil emulsion polymer with an aqueous saline fluid solution comprising said aque- ous saline fluid and said polymer precipitation and coagulation preventing surfactant; and introducing said treating fluid into said subterranean zone.

11. The method of claim 10 wherein said aqueous saline fluid is selected from the group consisting of unsaturated salt water, brine and seawater.

12. The method of claim 10 wherein said aqueous saline fluid is seawater.

13. The method of claim 10 wherein said polymer precipitation and coagulation preventing surfactant is selected from the group consisting of a $C_{4-12}$ alcohol ether sulfate substituted with 3 moles of ethylene oxide, a $C_{9-16}$ alcohol ether sulfate substituted with 2.5 moles of ethylene oxide, a $C_{8-10}$ alcohol ether sulfate substituted with 2.2 moles of ethylene oxide, a $C_{6-10}$ alcohol ether sulfate substituted with 2.5 moles of ethylene oxide, a $C_{8-10}$ alcohol ether sulfate substituted with 8 moles of ethylene oxide, a $C_{8-10}$ alcohol ether sulfate substituted with 6 moles of ethylene oxide, a $C_{8-10}$ alcohol ether sulfate substituted with 12 moles of ethylene oxide, and a $C_{14-16}$ alpha-olefin sulfonate.

14. The method of claim 10 wherein said polymer precipitation and coagulation preventing surfactant is a $C_{6-10}$ alcohol ether sulfonate substituted with 2.5 moles of ethylene oxide.

15. The method of claim 10 wherein said polymer coagulation preventing surfactant is present in said treating fluid in an amount in the range of from about 0.2% to about 1.5% by weight of water in said aqueous saline fluid therein.

16. The method of claim 10 wherein said polymer in said water-in-oil emulsion-is selected from the group consisting of a copolymer of styrene and butadiene; a copolymer of 2-acrylamido-2-propane sulfonic acid and N,N-dimethylacrylamide; a terpolymer of 2-acrylamido-2-propane sulfonic acid, acrylamide, and N,N-dimethylacrylamide; guar gum and derivatives thereof; cellulose derivatives; polyvinyl pyrrolidone; xanthan gum; and welan gum.

17. The method of claim 10 wherein said polymer is present in said water-in-oil emulsion in an amount in the range of from 30% to about 45% by weight of said water-in-oil emulsion.

18. The method of claim 10 wherein said water-in-oil emulsion polymer is present in said treating fluid in an amount in the range of from about 5% to about 50% by weight of said aqueous saline fluid therein.

19. The method of claim 10 wherein said treating fluid further comprises a hydraulic cement selected from the group consisting of Portland cements, slag cements, pozzolana cements, gypsum cements, alumina cements, and alkaline cements.

20. The method of claim 19 wherein said hydraulic cement is a Portland cement.

* * * * *